US005413707A

United States Patent [19]
Shatilov

[11] Patent Number: 5,413,707
[45] Date of Patent: May 9, 1995

[54] AQUARIUM SURFACE SWEEP PREFILTER

[76] Inventor: Alexander Y. Shatilov, 5654 Post Rd., Riverdale, N.Y. 10471

[21] Appl. No.: 231,756

[22] Filed: Apr. 25, 1994

[51] Int. Cl.⁶ .......................................... A01K 63/04
[52] U.S. Cl. ..................................... 210/169; 119/259
[58] Field of Search .................. 210/169, 242.1, 242.2, 210/242.3, 416.2, 459, 460, 499, 923; 119/259; 4/490

[56] References Cited

U.S. PATENT DOCUMENTS

| | | | |
|---|---|---|---|
| 2,961,098 | 11/1960 | Nash | 201/169 |
| 3,036,712 | 5/1962 | Barbara | 210/169 |
| 3,268,079 | 8/1966 | Sharrow, Jr. | 210/169 |
| 3,547,553 | 12/1970 | Stanfield | 210/242.3 |
| 3,616,918 | 11/1971 | Diemond | 210/169 |
| 3,633,749 | 1/1972 | Panosh | 210/169 |
| 3,970,556 | 7/1976 | Gore | 210/242.1 |
| 4,462,909 | 7/1984 | Kennel | 210/776 |
| 4,746,424 | 5/1988 | Drew | 210/169 |
| 4,781,827 | 11/1988 | Shields | 210/169 |
| 4,802,592 | 2/1989 | Wessels | 210/169 |
| 4,988,436 | 1/1991 | Cole | 210/169 |
| 5,078,867 | 1/1992 | Danner | 210/169 |
| 5,084,164 | 1/1992 | Del Rosario | 210/169 |
| 5,143,605 | 9/1992 | Masciarelli | 210/169 |
| 5,275,721 | 1/1994 | Mathews | 210/169 |

Primary Examiner—Robert A. Dawson
Assistant Examiner—Robert James Popovics

[57] ABSTRACT

An aquarium prefilter or surface skimmer which utilizes an open collection chamber having a plurality of vents providing communication between the surface water in the aquarium and the interior of the collection chamber. The collection chamber is adjustable vertically to compensate for varying water levels and preferably is so adjusted as to submerge such vents approximately one-quarter of an inch below the water surface. This effectively creates a drain on the surface which will suck in surface dirt, particles, leaves, etc. into the collection chamber when the device is connected to a suction pump as described herein. The collection unit is frictionally engaged to permit such vertical adjustment with a vertical suction tube having a mesh-protected opening at the upper end thereof to trap any large particles of debris. The suction tube has a coupling at its other end adapted to engage with the collar of an intake tube from a conventional aquarium filter unit e.g. a "Second Nature Whisper" power filter. The coupling is constructed with a pair of flexible spring detents which engage with the collar on the intake tube to provide a positive lock therewith.

2 Claims, 4 Drawing Sheets

AQUARIUM SURFACE SWEEP PREFILTER

BACKGROUND OF THE INVENTION

1. Field of the Invention

The present invention relates to aquarium filters and more particularly pertains to a prefilter unit which may be attached to conventional power filter units.

2. Description of the Prior Art

The use of filters and prefilters for aquariums is known in the prior art. More specifically, such units heretofore devised and utilized for the purpose of filtering aquarium water are known to consist basically of familiar, expected and obvious structural configurations, notwithstanding the myriad of designs encompassed by the crowded prior art which have been developed for the fulfillment of countless objectives and requirements. Typical of such devices are shown in U.S. Pat. Nos. 4,988,436; 3,547,553; 5,078,867; 5,084,164; and 4,462,909.

In this respect, the aquarium surface sweep prefilter unit according to the present invention substantially departs from the conventional concepts and designs of the prior art, and in so doing provides an apparatus primarily developed for the purpose of cleaning the water surface of an aquarium and preventing the conduction of large pieces of debris to the main filter unit.

Therefore, it can be appreciated that there exists a continuing need for new and improved filtering devices which can be used with a self-contained body of water within an aquarium tank. In this regard, the present invention substantially fulfills this need.

SUMMARY OF THE INVENTION

In view of the foregoing disadvantages inherent in the known types of filtering devices now present in the prior art, the present invention provides an improved prefilter construction wherein the same can be utilized with any conventional power filter. As such, the general purpose of the present invention, which will be described subsequently in greater detail, is to provide a new and improved filter apparatus which has all the advantages of the prior art devices and none of the disadvantages.

To attain this, the present invention essentially comprises an aquarium prefilter or surface skimmer which utilizes an open collection chamber having a plurality of vents providing communication between the surface water in the aquarium and the interior of the collection chamber. The collection chamber is adjustable vertically to compensate for varying water levels and preferably is so adjusted as to submerge such vents approximately one-quarter of an inch below the water surface. This effectively creates a drain on the surface which will suck in surface dirt, particles, leaves, etc. into the collection chamber when the device is connected to a suction pump as described herein. The collection unit is frictionally engaged to permit such vertical adjustment with a vertical suction tube having a mesh-protected opening at the upper end thereof to trap any large particles of debris. The suction tube has a coupling at its other end adapted to engage with the collar of an intake tube from a conventional aquarium filter unit e.g. a "Second Nature Whisper" power filter. The coupling is constructed with a pair of flexible spring detents which engage with the collar on the intake tube to provide a positive lock therewith. The collection unit is periodically removed from the vertical suction tube to permit discarding particulate material trapped therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium prefilter unit which has all the advantages of the prior art filters and none of the disadvantages.

It is another object of the present invention to provide a new and improved aquarium surface sweep prefilter unit which may be easily and efficiently manufactured and marketed.

It is a further object of the present invention to provide a new and improved aquarium surface sweep prefilter unit which is of a durable and reliable construction.

An even further object of the present invention is to provide a new and improved aquarium surface sweep prefilter unit which is susceptible of a low cost of manufacture with regard to both materials and labor, and which accordingly is then susceptible of low prices of sale to the consuming public, thereby making such units economically available to the buying public.

Still yet another object of the present invention is to provide a new and improved aquarium prefilter which provides in the apparatuses and methods of the prior art some of the advantages thereof, while simultaneously overcoming some of the disadvantages normally associated therewith.

Still another object of the present invention is to provide a new and improved attachment for conventional aquarium filters.

Yet another object of the present invention is to provide a new and improved means for attaching the prefilter to a conventional power filter for aquariums.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
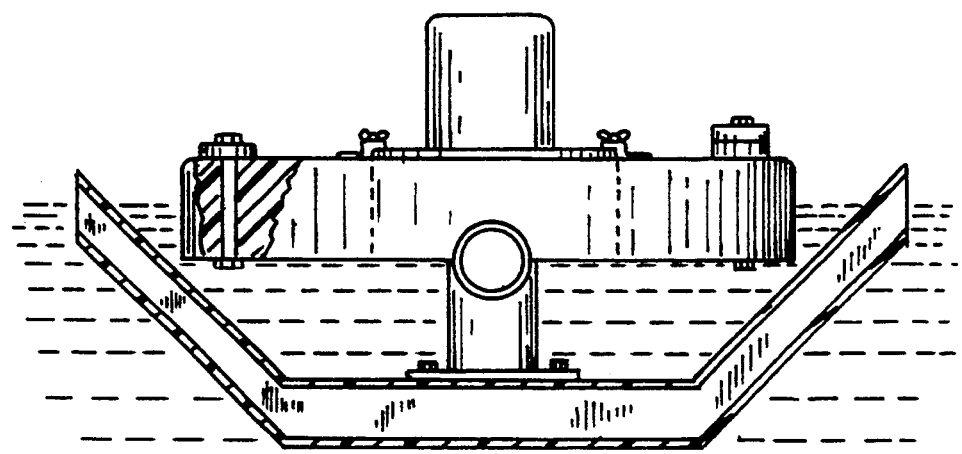
FIGS. 1 and 2 are illustrations of prior art filter devices.
Figure 2:
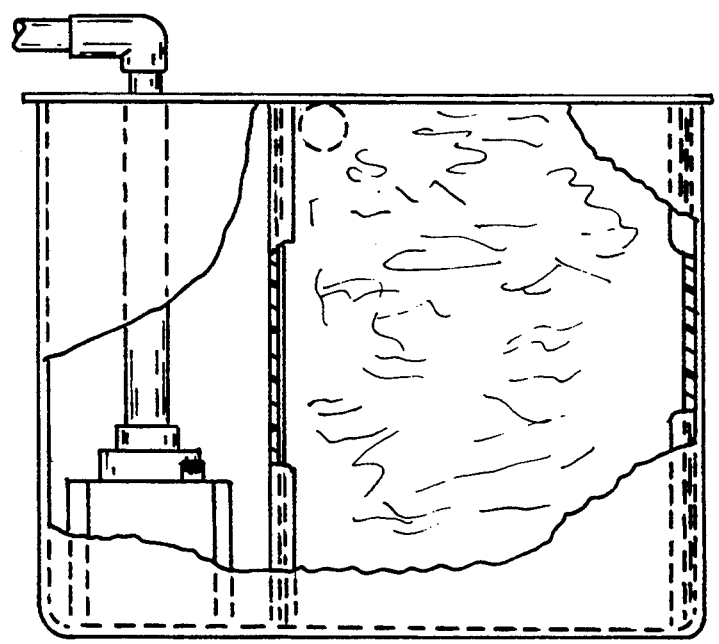

FIG. 1 and 2 of the drawings illustrate prior art filtration devices. FIG. 1 shows a surface skimmer wherein water with entrapped surface particles is collected and then pumped outboard of the tank and not to a filter. FIG. 2 is a conventional filter wherein water is drawn from the bottom of an aquarium and then pumped through a filter.

Figure 3:
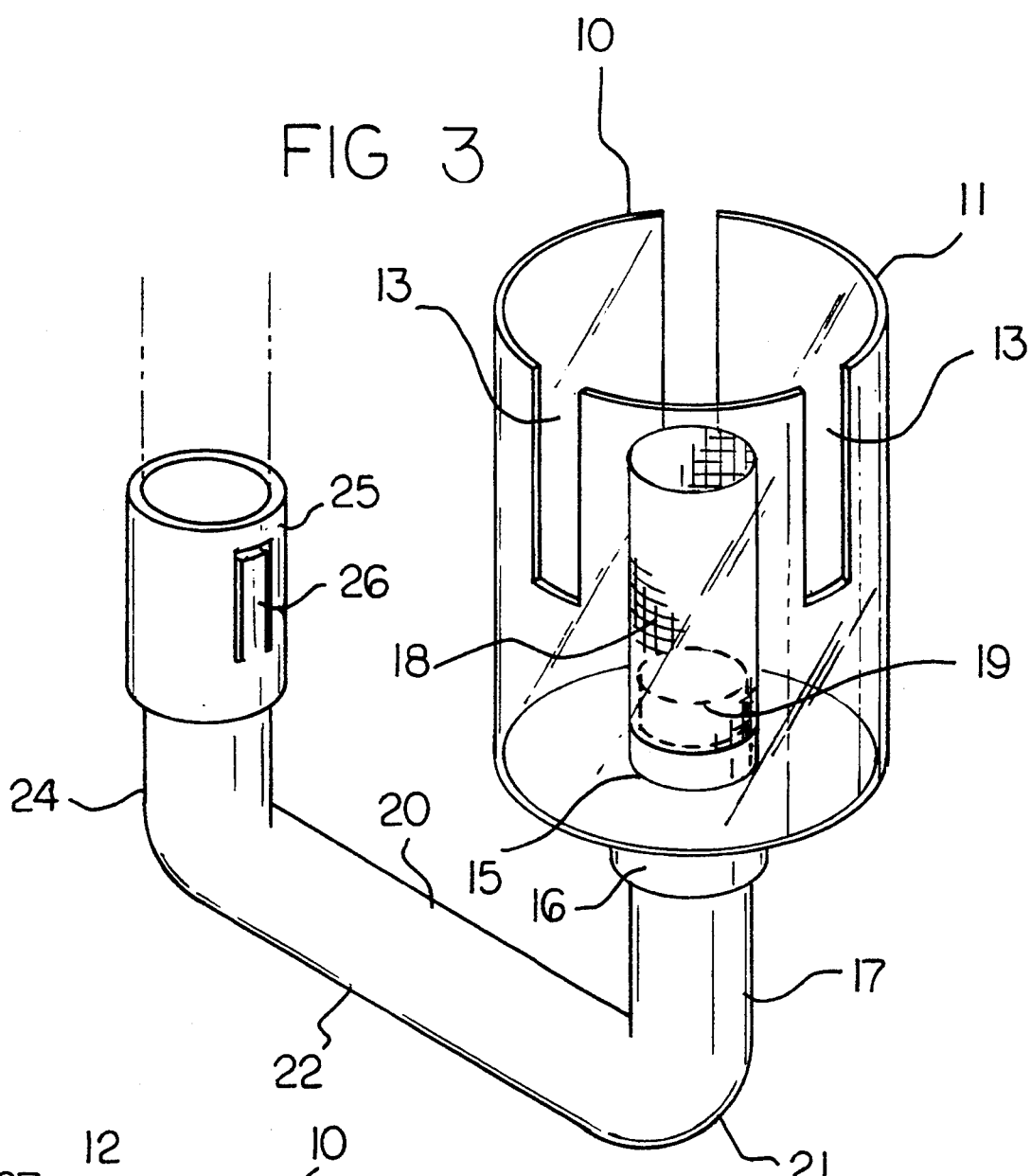
FIG. 3 is a perspective view of the prefilter unit of the present invention.

With reference now to FIG. 3 of the drawings, a new and improved aquarium prefilter embodying the principles and concepts of the present invention and generally designated by the reference numeral 10 will be described.

More specifically, it will be noted that the unit 10 has a collection chamber 11 comprising an open cylindrical container 12 with a plurality of rectangular slots 13 extending from the upper edge thereof approximately one-half way down the sides of such container 12. Base 14 of container 12 has a central circular opening 15 with an open coupling 16 affixed to said base 14 and extending downwardly from base 14 in frictional engagement with a vertical section 15 of a U-shaped suction tube 20. Suction tube section 17 has a circular mesh screen 18 affixed to the upper end 12 thereof and normally disposed within container 12. Screen 18 is frictionally engaged with the upper end 19 of vertical section 17 of tube 20 and is slidably removable therefrom for cleaning when desired. Tube 20 continues below coupling 16 to a right angle bend 21 thence to a horizontal section 22 and to a second right angle bend 23 from which tube 20 again extends upwardly in a second vertical section 24.

Affixed to the upper end of section 24 of tube 20 is a coupling member 25 adapted to accept in mating engagement the intake end of a ground suction tube leading to a power filter (not shown in this Figure). As illustrated particularly in FIGS. 7 and 8 below, coupling member 25 has means 26 thereon for securely affixing such coupling member 25 to the ground mating tube.

Figure 4:
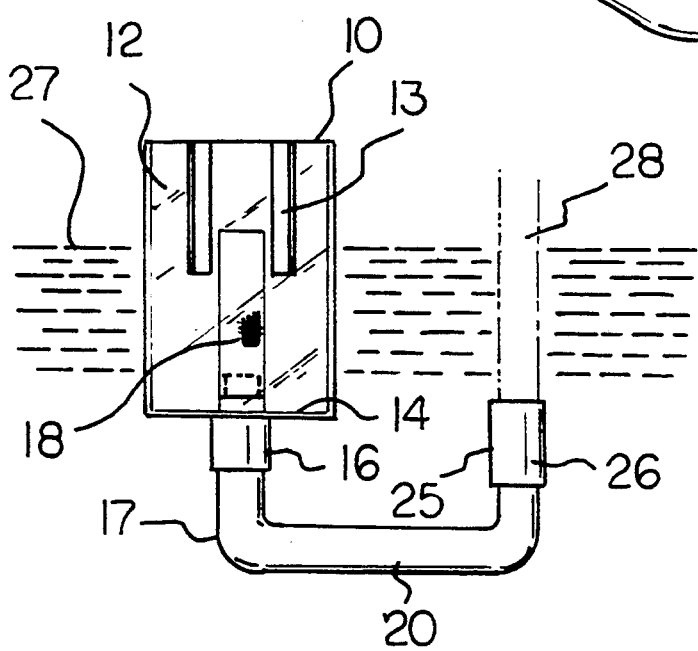
FIG. 4 is a side plan view of the unit of FIG. 3 in place in an aquarium tank.

As shown in FIG. 4, the unit 10 is submerged in the water 27 of an aquarium (shown in broken lines) with collection unit 11 extending above such water level and the entire unit 10 being supported from the suction tube 28 (shown in broken lines) of a conventional power filter (not shown). The cylindrical container 12 is slidably adjusted on vertical section 17 and held in such adjusted position by the frictional engagement of coupling 16 with tube section 17. The adjustment places the lower ends of rectangular slots 13 approximately one-quarter inch below the surface of water 27, resulting in water from the surface being drawn in through such slots 13 into the interior of container 12 wherein it is drawn through the mesh screen 16 and thence down tube 20 to the filter. Debris and particulate material of any significant size is trapped by screen 16 from which (when the filter functions intermittently as is common) it falls to the bottom 14 of container 12. Periodically, container 12 is slipped up and off tube section 17 to empty out collected debris, at which time screen sections 18 may also be cleaned if necessary.

Figure 5:
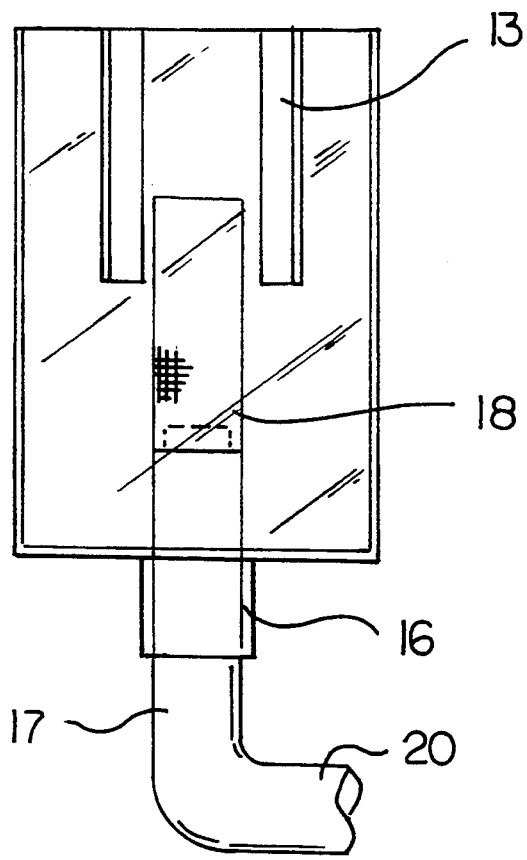
FIGS. 5 and 6 are side plan views of the relative positioning of the collector unit on the suction tube of the present invention with FIG. 5 showing adjustment for a lower water level and FIG. 6 for a high water level.
Figure 6:
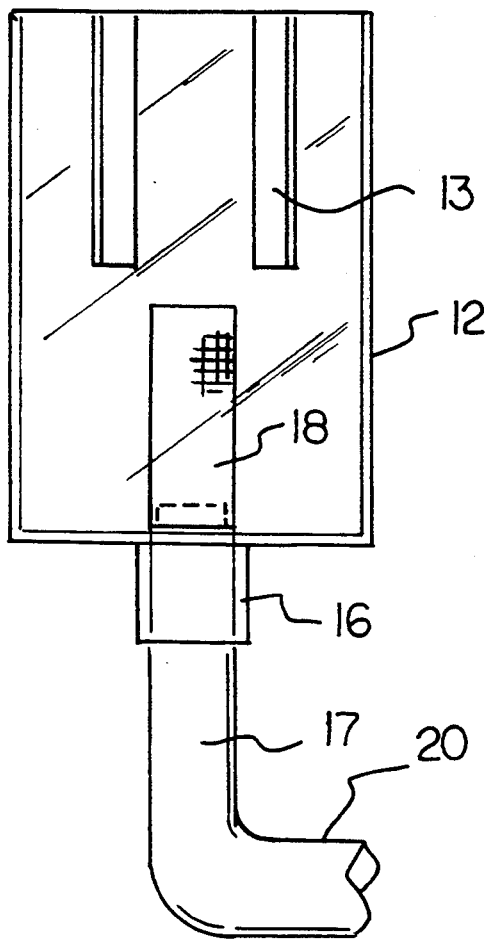

FIGS. 5 and 6 illustrate the slidable adjustment of container 12 on vertical tube section 17 of suction tube 20 by the engagement of coupling 16 with the vertical tube section 17.

Figure 7:
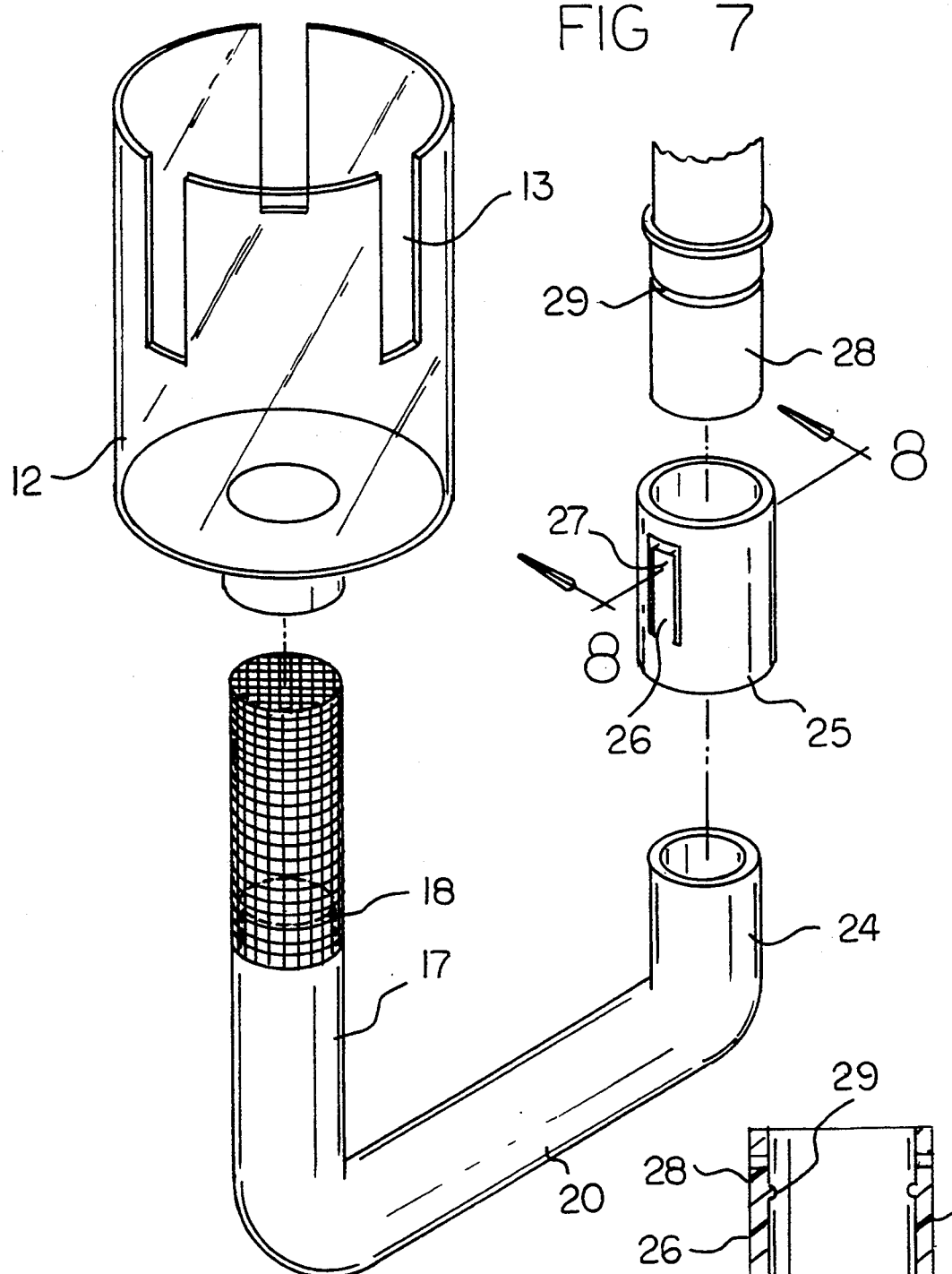
FIG. 7 is an exploded perspective view of the present invention.

FIG. 7 shows in exploded format the elements of the prefilter unit 10 of the present invention. The open cylindrical container 12 with the vertical slots 13 and attached central coupling 16; the vertical section 17 of U-shaped suction tube 20 with the mesh intake screen 18 thereon; coupling 25 which terminates the other vertical tube section 24 of U-shaped suction tube 20 with its retaining means 26 (discussed in connection with FIG. 8 below); and a conventional filter intake tube 28 showing the grooves 29 therein.

Figure 8:
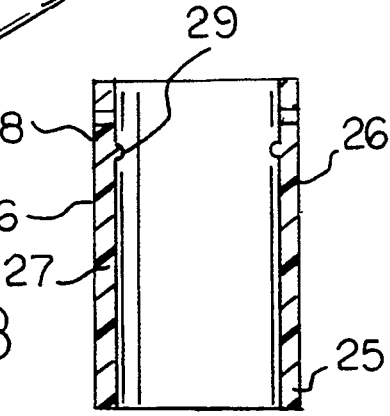
FIG. 8 is a sectional view on line 8—8 of FIG. 7.

FIG. 8 illustrates in a sectional view the retaining means 26 in coupling 25. Such means 26 are spring flaps 27 formed by cutting out three sides of a rectangular opening in coupling 25, leaving the base thereof attached to coupling 25. The upper free end 28 of flap 27 has on its inner surface a detent projection 29 which extends inwardly of coupling 25. When slipped over the intake tube 28 of conventional filter, the detent 29 will snap into the groove 29 thereof and provide a positive engagement between tube 28 and coupling 25. This is necessary since the prefilter unit 10 depends from tube 28 and must be retained thereon to permit operation of such unit 10.

Preferably all elements of the unit 10 are formed of clear, rigid plastic such as polypropylene or polyvinyl with the exception of mesh screen 18 which may be of any suitable metal such as copper or rigid plastic such as nylon.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium surface sweep prefilter comprising:
   a collection chamber including an open cylindrical container having a top end, a cylindrical sidewall, and a base, with a plurality of slots extending downwardly from said top end of said cylindrical container and through said sidewall thereof, the base of said cylindrical container including a central circular opening extending therethrough;
   an open coupling affixed to said base of said cylindrical container and extending downwardly therefrom;
   a U-shaped suction tube having a first vertical section extending through said open coupling and into an interior of said cylindrical container, whereby said cylindrical container is slidably positioned along said first vertical section to permit adjusting of said cylindrical container relative to said first vertical section of said U-shaped suction tube with frictional engagement between said open coupling and an exterior of said first vertical section retaining said cylindrical container relative to said U-shaped suction tube, said U-shaped suction tube having a horizontal section extending substantially orthogonally from said vertical section and connecting with a second vertical section oriented so as to extend substantially orthogonally from said horizontal section and into a spaced and substantially parallel orientation with said first vertical section of said U-shaped suction tube;
   a circular mesh screen coupled to an end of said first vertical section and positioned within said interior of said cylindrical container; and,
   coupling member means for securing said second vertical section to a depending filter intake tube.

2. The aquarium surface sweep prefilter of claim 1, wherein said coupling member means comprises a cylindrical coupling secured to said second vertical section of said U-shaped suction tube and having a pair of diametrically opposed apertures extending therethrough, said cylindrical coupling including a first spring flap positioned within a first one of said opposed apertures and coupled to said cylindrical coupling along a lower portion of said first opposed aperture, and a second spring flap positioned within a second one of said opposed apertures and coupled to said cylindrical coupling along a lower portion of said second opposed aperture, said spring flaps each including a detent projection extending from an upper free end thereof which projects into an interior of said cylindrical coupling for engagement with a groove of the depending filter intake tube when the depending filter intake tube is positioned within the cylindrical coupling.

* * * * *